United States Patent [19]

Odagawa

[11] Patent Number: 5,283,743
[45] Date of Patent: Feb. 1, 1994

[54] VEHICLE-DIRECTION MEASURING APPARATUS

[75] Inventor: Satoshi Odagawa, Saitama, Japan

[73] Assignee: Pioneer Electronic Corporation, Tokyo, Japan

[21] Appl. No.: 851,163

[22] Filed: Mar. 13, 1992

[30] Foreign Application Priority Data

Apr. 16, 1991 [JP] Japan .................. 3-084196

[51] Int. Cl.$^5$ .................. G06F 15/50; G01C 17/38
[52] U.S. Cl. .................. 364/457; 364/449; 364/571.05; 340/990
[58] Field of Search .......... 364/452, 449, 457, 471.05; 340/990, 995

[56] References Cited

U.S. PATENT DOCUMENTS

| | | | |
|---|---|---|---|
| 4,672,565 | 6/1987 | Kuno et al. | 364/457 |
| 4,677,562 | 6/1987 | Uota et al. | 364/449 |
| 4,831,563 | 5/1989 | Ando et al. | 364/571.05 |
| 4,852,012 | 7/1989 | Suyama | 364/449 |
| 4,862,398 | 8/1989 | Shimizu et al. | 364/571.05 |
| 4,866,627 | 9/1989 | Suyama | 364/457 |
| 5,117,363 | 5/1992 | Akiyama et al. | 364/449 |
| 5,151,872 | 9/1992 | Suzuki et al. | 364/571.05 |
| 5,172,322 | 12/1992 | Takano et al. | 364/449 |
| 5,216,816 | 6/1993 | Ida | 33/356 |

FOREIGN PATENT DOCUMENTS

| | | |
|---|---|---|
| 59-100812 | 6/1984 | Japan . |
| 63-284410 | 11/1988 | Japan . |
| 63-284413 | 11/1988 | Japan . |
| 1-98920 | 4/1989 | Japan . |

Primary Examiner—Thomas G. Black
Assistant Examiner—Tan Q. Nguyen
Attorney, Agent, or Firm—Sughrue, Mion, Zinn, Macpeak & Seas

[57] ABSTRACT

Central coordinate data located on a circle of magnetism obtained from the X-Y coordinate data detected by a terrestrial magnetism sensor are calculated in correspondence with the direction of the road, calculated using map data or by a GPS device, and a present declination correction value each time the direction of the road is obtained. The declination correction value is automatically updated in such a manner as to decrease the radius of the circle of magnetism.

5 Claims, 3 Drawing Sheets

VEHICLE-DIRECTION MEASURING APPARATUS

BACKGROUND OF THE INVENTION

The present invention relates to a vehicle-mounted navigation system, and more particularly to a vehicle-direction measuring apparatus using a terrestrial magnetism sensor.

In a terrestrial magnetism sensor, a pair of magnetism detecting elements are disposed in the same plane and have a phase angle of 90° with respect to each other. One of them is adapted to detect a terrestrial magnetism component in the X-direction (easterly direction), while the other is adapted to detect a terrestrial magnetism component in the Y-direction (northerly direction). If this terrestrial magnetism sensor is placed in a horizontal direction and is made to undergo one complete revolution, then the path of a circle, i.e., a magnetic circle, is depicted on X-Y coordinates by means of output values from both the X- and Y-direction magnetism detecting elements. Accordingly, if it is assumed that a central point of the path of the circle is (x0, y0), and that the X-Y coordinate data, which are output values of the terrestrial magnetism sensor, are (x, y), the direction $\theta$ can be expressed as $$\theta = \tan^{-1}(y - y0)/(x - x0) \tag{1}$$

However, in a case where the terrestrial magnetism sensor is mounted in a vehicle, in addition to the magnetization of a steel plate of the body, the length of the vehicle body exerts an influence on the direction $\theta$. Since the body of an automobile has a rectangular configuration having a long longitudinal side, the perpendicular projection density of a magnetizable material such as a steel plate differs between the longitudinal direction and the transverse direction of the body. Therefore, even if the body is magnetized uniformly, the detection sensitivity of the X- and Y-direction magnetism detecting elements that are perpendicular to each other still differs.

Accordingly, the path of output values of the terrestrial magnetism sensor becomes elliptical when the vehicle with the terrestrial magnetism sensor mounted thereon makes one rotation rather than a circle, as shown in FIG. 5. If an ellipticity k (=Rx/Ry) is used to correct the output values (x, y) obtained by the terrestrial magnetism sensor, the output values become (x, ky−ky0+y0), so that the elliptical path is corrected to a round path. Hence, the direction $\theta M$ of the vehicle obtained by the terrestrial magnetism sensor can be expressed as $$\theta M = \tan^{-1}\{k(y - y0)\}/(x - x0) \tag{2}$$

An angular difference between north on the map (true north) and north obtained from terrestrial magnetism (magnetic north) is called declination. This declination occurs due to the fact that the pole of the earth and the magnetic pole differ. For instance, the declination of the Kanto district (including Tokyo) and its vicinity is −6° (indicating that the magnetic north is offset by 6° to the west from true north), while the declination of San Francisco and its vicinity is +15° (indicating that the magnetic north is offset by 15° to the east from true north). Accordingly, in the vehicle-mounted navigation system using the terrestrial magnetism sensor for measuring terrestrial magnetism, it is necessary to correct declination in order to determine an accurate direction. In addition, in the navigation system, a mounting error unavoidably occurs when the terrestrial magnetism sensor is mounted in a vehicle. A numerical value for correcting declination by taking into account this error as well is a declination correction value $\theta 0$. If the direction $\theta M$ of the vehicle is corrected by the declination correction value $\theta 0$, it becomes $$\theta M = \tan^{-1}\{k(y - y0)\}/(x - x0) - \theta 0 \tag{3}$$

With the conventional vehicle-mounted navigation system, however, at the time of setting the declination correction value $\theta 0$ the difference between the direction of terrestrial magnetism displayed on the screen and the direction of the road estimated at the present position is manually inputted by the user through a key operation or the like. Therefore, it is difficult to input a small value of several degrees as an appropriate value, resulting in a lowering of the accuracy with which the direction on the map is detected.

SUMMARY OF THE INVENTION

Accordingly, an object of the invention is to provide a vehicle-direction measuring apparatus using a terrestrial magnetism sensor capable of improving the accuracy with which the direction on a map is detected, by obtaining an appropriate declination correction value.

The vehicle-direction measuring apparatus in accordance with the present invention is a vehicle-direction measuring apparatus for correcting the direction of a vehicle in correspondence with a declination correction value by obtaining the direction of the vehicle on the basis of X-Y coordinate data detected by a vehicle-mounted terrestrial magnetism sensor. The apparatus includes: means for obtaining the direction of a road in correspondence with map data; means for calculating in correspondence with the direction of the road and the declination correction value central coordinate data on a circle of magnetism obtained from the X-Y coordinate data detected by the terrestrial magnetism sensor each time the direction of the road is obtained; and updating means for updating the declination correction value in such a manner as to decrease the radius of a circle having the central coordinate data on a path with a central point of the circle of magnetism as a center.

In addition, the vehicle-direction measuring apparatus in accordance with the present invention is a vehicle-direction measuring apparatus for correcting the direction of the vehicle in correspondence with a declination correction value by obtaining the direction of the vehicle on the basis of X-Y coordinate data detected by a vehicle-mounted terrestrial magnetism sensor. The apparatus includes: means for obtaining the direction of a road in correspondence with GPS data; means for calculating in correspondence with the direction of the road corresponding to the GPS data and the declination correction value central coordinate data on a circle of magnetism obtained from the X-Y coordinate data detected by the terrestrial magnetism sensor each time the direction of the vehicle corresponding to the GPS data is obtained; and updating means for updating the declination correction value in such a manner as to decrease the radius of a circle having the central coordinate data on a path with a central point of the circle of magnetism as a center.

DETAILED DESCRIPTION OF THE PREFERRED EMBODIMENTS

Figure 1:
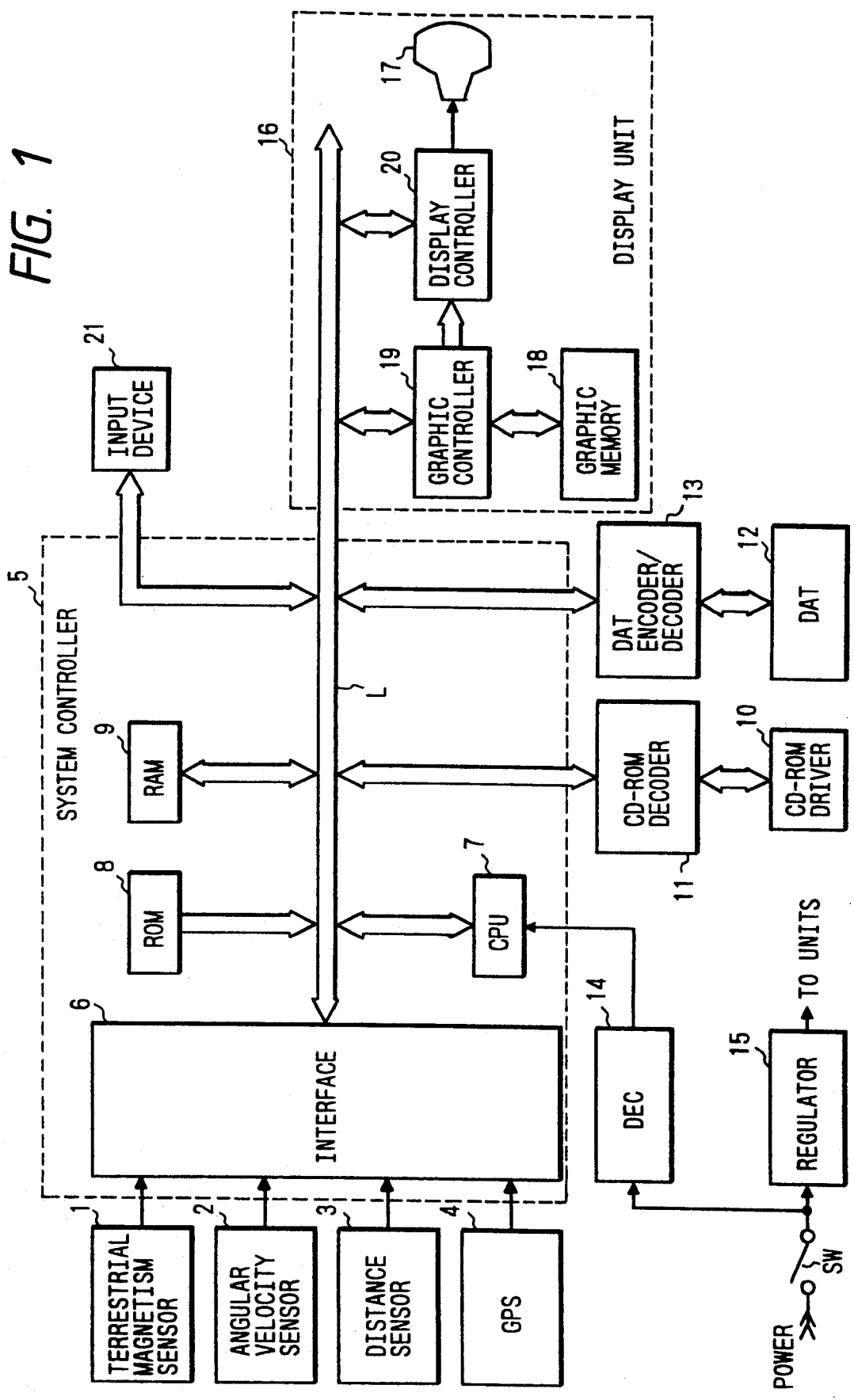
FIG. 1 is a block diagram illustrating an embodiment of the present invention.

FIG. 1 is a block diagram illustrating an embodiment of a vehicle-mounted navigation system to which the vehicle-direction measuring apparatus using a terrestrial magnetism sensor in accordance with the present invention is applied. In this navigation system, a terrestrial magnetism sensor 1 is disposed for detecting the running direction of the vehicle, and is composed of a pair of magnetism detecting elements disposed in the same plane and having a phase angle of 90° with respect to each other, as described above. An angular velocity sensor 2 detects the angular velocity of the vehicle; a distance sensor 3 detects the running distance of the vehicle; and a GPS (global positioning system) device 4 detects an absolute position of the vehicle from latitude and longitude information and the like in a well-known manner. The detection outputs of these sensors (and GPS device) are supplied to a system controller 5. The distance sensor 3 includes a pulse generator for generating a pulse each time the drive shaft (not shown) of the vehicle rotates by a predetermined angle. This pulse generator is well known and generates a pulse by magnetically or optically detecting the position of an angle of rotation of the drive shaft.

The system controller 5 includes an interface 6 which receives as its inputs the detection outputs of the sensors (and GPS device) 1 - 4 and is adapted to effect processing such as A/D (analog/digital) conversion; a CPU (central processing unit) 7 for performing various image data processing and calculating the running distance and running direction of the vehicle, the coordinates (latitude and longitude) of the present location, and the like on the basis of the output data from the sensors (and GPS device) that are consecutively sent from the interface 6; a ROM (read-only memory) 8 in which various processing programs of the CPU 7 and other necessary information are stored; and a RAM (random-access memory) 9 for writing or reading information necessary in the execution of the programs.

A CD-ROM (shown in FIG. 1 as CD-ROM Driver 10 and CD-ROM Decoder 11) serving as a read-only nonvolatile storage medium and a DAT (digital audio tape) (shown in FIG. 1 as DAT Deck 12 and DAT Encoder/Decoder 13) serving as a random-access nonvolatile storage medium, for instance, are used as external storage media. It should be noted that the external storage media are not restricted to the CD-ROM and the DAT, and it is possible to use such a nonvolatile storage medium as an IC card. Map data obtained by digitizing (numerically representing) various points on the roads of the map is stored in the CD-ROM. As for this CD-ROM, the reading of stored information is effected by a CD-ROM driver 10. The reading output of the CD-ROM driver 10 is decoded by a CD-ROM decoder 11 and is sent to a bus line L.

Meanwhile, the DAT is used as a backup memory, and the recording or reading of information is effected by a DAT deck 12. When the power source of the vehicle is turned off, information such as the present coordinates of the present location of the vehicle is stored in the DAT as backup data by being supplied to the DAT deck 12 via a DAT encoder/decoder 13. When the power source of the vehicle is turned on, the information stored in the DAT is read by the DAT deck 12. The information thus read is sent to the bus line L via the DAT encoder/decoder 13 so as to be stored in the RAM 9.

The turning on and off of the power source of the vehicle is detected by a detection circuit 14 which monitors an output level of an accessory switch SW of the vehicle. The power for the vehicle supplied from a battery (not shown) via the accessory switch SW is stabilized by a regulator 15 and is supplied as power for various units of the apparatus. When the accessory switch SW is turned off, the output voltage of the regulator 15 does not instantly drop due to a time constant provided for the circuit, and the backup data is stored in the DAT serving as the backup memory during the time of this fall.

During the running of the vehicle, the CPU 7 calculates the running direction of the vehicle on the basis of the output data from the terrestrial magnetism sensor 1 and the angular velocity sensor 2 at a predetermined period through a timer interruption process in which the running direction is calculated whenever a timer expires, determines the coordinates of the present location of the vehicle from the running distance and the running direction through an interruption process based on a fixed-distance running on the basis of the output data from the distance sensor 3, and collects map data on a fixed range of a district including the coordinates of the present location from the CD-ROM. The CPU 7 then temporarily stores the collected data in the RAM 9 serving as the buffer memory, and supplies the same to a display unit 16.

The display unit 16 comprises a display 17 such as a CRT; a graphic memory 18 constituted by a V(Video)-RAM or the like; a graphic controller 19 for causing the map data sent from the system controller 5 to be plotted in the graphic memory 18 as image data, and for outputting this image data; and a display controller 20 for effecting control so as to display a map on the display 17 on the basis of the image data outputted from the graphic controller 19. An input device 21 is constituted by a keyboard or the like, and issues various commands and the like to the system controller when the user presses certain keys.

Figure 2:
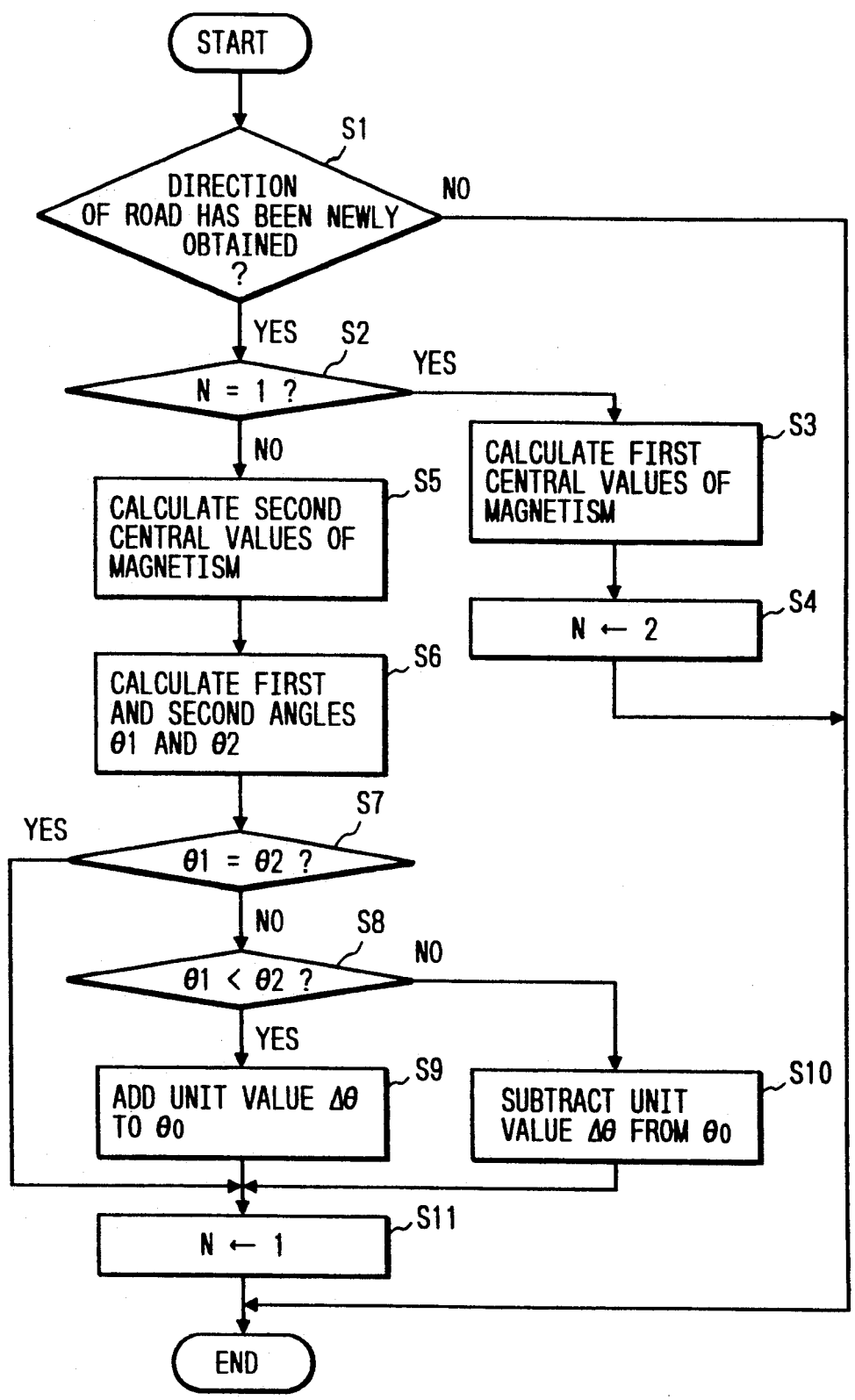
FIG. 2 is a flowchart illustrating the operation of a CPU of the apparatus shown in FIG. 1.

Referring now to a subroutine shown as a flowchart in FIG. 2, a description will be given of a processing procedure for updating a declination correction value θ0, which is executed by the CPU 7.

At predetermined times, the CPU 7 first determines whether or not the direction of the road has been newly obtained (Step S1). The direction of the road is obtained through map matching from the relationship between the present position on the map and the direction of the road being travelled upon. If the direction of the road has not been obtained, this routine ends. If the direction of the road has been obtained, a determination is made as to whether or not a variable N is equal to 1 (Step S2). An initial value of this variable N is 1. If N equals 1, first central values of magnetism (first coordinate data) are calculated as described below by using the direction of the road obtained (Step S3).

If it is assumed that the X-Y coordinate data obtained by the terrestrial magnetism sensor 1 are (x, y), the radius of the circle of magnetism formed by the X-Y coordinate data in a case where the vehicle has undergone one rotation is Rx, the ellipticity for roundness correction is k, the direction of the road obtained is $\theta R$, and the declination correction value is $\theta 0$, the central values of magnetism (x0, y0) can be calculated by the following formula:

$$x0 = x - Rx \cos(\theta R + \theta 0) \quad y0 = y - (1/k)RX \sin(\theta R + \theta 0) \quad (4)$$

In Step S3, the X-Y coordinate data obtained by the terrestrial magnetism sensor 1 are set as (x1, y1), and the first central values of magnetism calculated by using Formulae 4 are set as (x01, y01). After execution of Step S3, the variable N is made to equal 2 (Step S4), and this routine ends.

If N does not equal 1 in Step S2, it is assumed that N equals 2, and the second central values of magnetism (second central coordinate data) are calculated as described below by using the direction of the road obtained (Step S5). The X-Y coordinate data obtained by the terrestrial magnetism sensor 1 at this juncture are set as (x2, y2), and the second central values of magnetism calculated by using Formulae 4 are set as (x02, y02).

Figure 3:
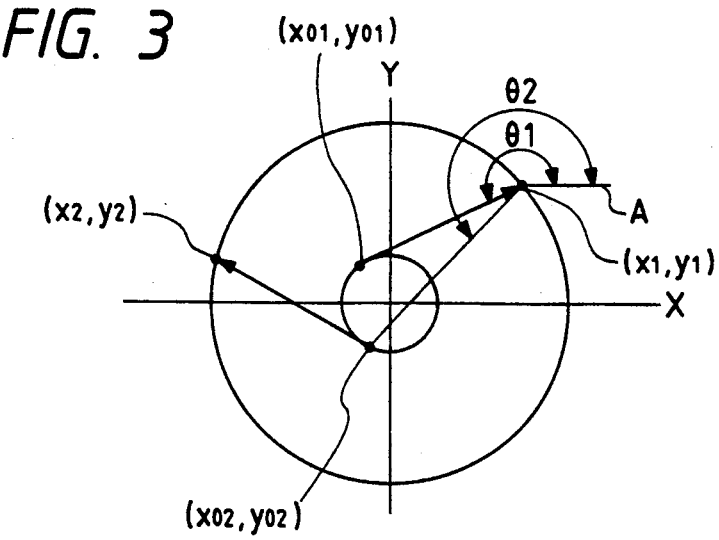
FIG. 3 is a diagram illustrating an updating operation of a declination correction value.

After execution of Step S5, the CPU 7 calculates a first angle $\theta 1$ formed by the X-Y coordinate data (x1, y1) and the first central values of magnetism (x01, y01) as well as a second angle $\theta 2$ formed by the X-Y coordinate data (x1, y1) and the second central values of magnetism (x02, y02) (Step S6). That is, the CPU 7 determines the angle $\theta 1$ (see FIG. 3) formed by a reference line A and a straight line connecting the X-Y coordinate data (x1, y1) and the first central values of magnetism (x01, y01), and the angle $\theta 2$ formed by the reference line A and a straight line connecting the X-Y coordinate data (x1, y1) and the second central values of magnetism (x02, y02). The angles $\theta 1$ and $\theta 2$ are calculated from the following formulae:

$$\theta 1 = \tan^{-1} (y01 - y1)/(x01 - x1)$$

$$\theta 2 = \tan^{-1}(y02 - y1)/x02 - x1) \quad (5)$$

After calculation of the angles $\theta 1$ and $\theta 2$, a determination is made as to whether or not the angles $\theta 1$ and $\theta 2$ are equal to each other (Step S7), and if $\theta 1 = \theta 2$, it is unnecessary to update the declination correction value $\theta 0$, so that the operation proceeds to Step S11 which will be described later. If $\theta 1$ does not equal $\theta 2$, a determination is made as to whether or not the angle $\theta 1$ is smaller than the angle $\theta 2$ (Step S8). If $\theta 1$ is less than $\theta 2$, a unit value $\Delta \theta$ is added to the present declination correction value $\theta 0$, and the value of the added result is set as a new declination correction value $\theta 0$ (Step S9). If $\theta 1$ is greater than $\theta 2$, the unit value $\Delta \theta$ is subtracted from the present declination correction value $\theta 0$, and the value of the subtracted result is set as a new declination correction value $\theta 0$ (Step S10). After execution of Step S9 or S10, the operation proceeds to Step S11 to make the variable N equal 1, and this routine ends. The CPU 7 determines the direction of the vehicle $\theta M$ from Formula 3 by using the updated declination correction value $\theta 0$.

Figure 4:
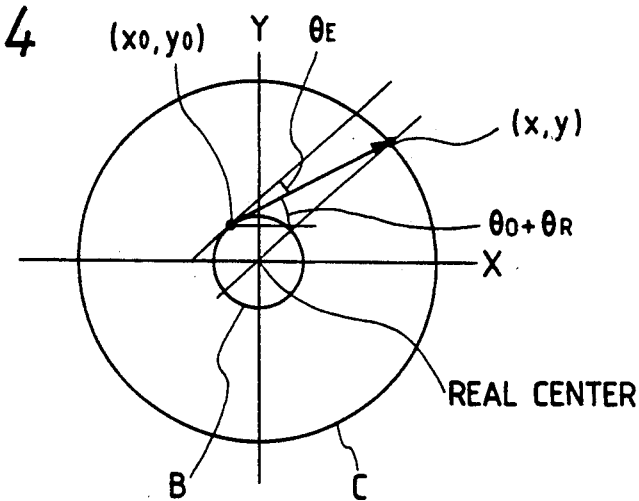
FIG. 4 is a diagram illustrating another updating operation of the declination correction value.
Figure 5:
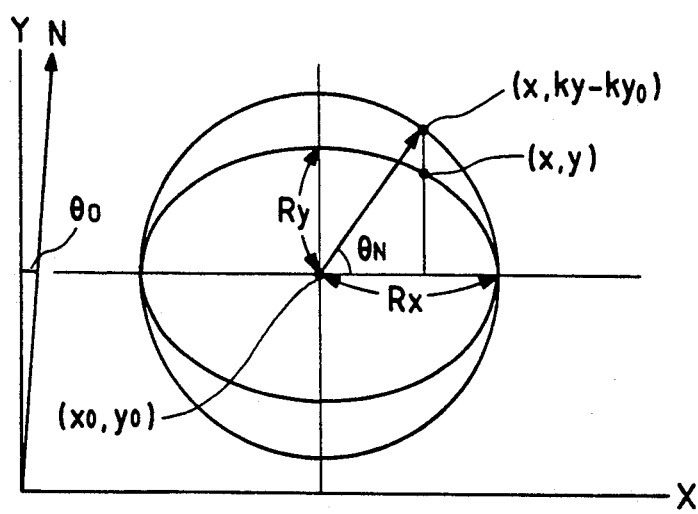
FIG. 5 is a diagram illustrating a path of output values from a terrestrial magnetism sensor.

In such an updating operation of the declination correction value $\theta 0$, the first and second central values of magnetism are calculated by using the same declination correction value $\theta 0$ (see Formulae 4). If this declination correction value $\theta 0$ is a true value, the first and second central values of magnetism become true central values of magnetism. However, if the declination correction value $\theta 0$ is erroneous, the first and second central values of magnetism are located on a concentric circle having the true central values of magnetism as a center. That is, as shown in FIG. 4, the X-Y coordinate data (x, y) obtained by the terrestrial magnetism sensor 1 are located on a circle C having the true central values of magnetism as a center. With respect to the central values of magnetism (x0, y0) obtained from Formulae 4, the declination correction value $\theta 0$ is erroneous, since these central values of magnetism are located at a position spaced apart from the true central values of magnetism located at the origin in FIG. 4. If the error of the declination correction value $\theta 0$ is the same, even if the X-Y coordinate data (x, y) obtained by the terrestrial magnetism sensor 1 change due to a change in the direction of the vehicle, the central values of magnetism (x0, y0) obtained from Formulae 4 are located on a concentric circle B having the true central values of magnetism as a center. The declination correction value $\theta 0$ is updated in such a manner that the radius of this circle becomes small, so as to reduce the error of the declination correction value $\theta 0$. It should be noted that, in FIG. 4, $\theta R + \theta 0$ is an angle in which the declination correction value at that time is added to the direction of the road, and $\theta E$ is an error of the declination correction value $\theta 0$.

It should be noted that although, in the above-described embodiment, a determination is made in Step S1 as to whether or not the direction of the road has been newly obtained, in a case where the direction of the vehicle is detected by obtaining the direction of a velocity vector from the GPS data such as latitude and longitude data by using the GPS device 4, a determination may be made in Step S1 as to whether or not the direction of the. vehicle has been newly obtained by means of the GPS data.

In the first aspect of the invention, central coordinate data of a circle of magnetism obtained from the X-Y coordinate data detected by the terrestrial magnetism sensor are calculated in correspondence with the direction of the road and a current declination correction value each time the direction of the road is obtained. The declination correction value is updated in such a manner as to decrease the radius of a circle having the central coordinate data on the circle with a central point of the circle of magnetism as a center.

In addition, in the second aspect of the invention, central coordinate data of a circle of magnetism obtained from the X-Y coordinate data detected by the terrestrial magnetism sensor are calculated in correspondence with the direction of the road corresponding to the GPS data and a present declination correction value each time the direction of the vehicle corresponding to the GPS data is obtained. The declination correction value is updated in such a manner as to decrease the radius of a circle having the central coordinate data on the circle with a central point of the circle of magnetism as a center.

Accordingly, in accordance with these aspects of the invention, it is possible to constantly obtain an appropriate declination correction value automatically, so that it is possible to improve the accuracy with which the direction of the vehicle on the map is detected by means of the terrestrial magnetism sensor or the GPS device.

What is claimed is:

1. A vehicle-direction measuring apparatus for determining the direction of a vehicle in correspondence with a declination correction value by obtaining the direction of the vehicle on the basis of X-Y coordinate data detected by a vehicle-mounted terrestrial magnetism sensor, said apparatus comprising:

obtaining means for obtaining the direction of a road on which the vehicle is traveling in correspondence with map data;

calculating means for calculating central coordinate data located on a circle of magnetism, said circle having a center representing a true center of magnetism, based on the direction of the road, a present declination correction value, and said X-Y coordinate data detected by said terrestrial magnetism sensor each time the direction of the road is obtained by said obtaining means;

correcting means for correcting the declination correction value based on outputs of said calculating means to produce a corrected declination correction value; and means for determining the direction of the vehicle in accordance with an output of said terrestrial magnetism sensor and said corrected declination correction value.

2. An apparatus according to claim 1, wherein said correcting means includes means for calcuating a first angle formed between.

a) a straight line connecting a first point represented by first central coordinate data calculated by said calculating means with respect to first X-Y coordinate data detected by said terrestrial magnetism sensor and a second point represented by the first X-Y coordinate data and b) a reference line passing horizontally through the first X-Y coordinate data.

3. An apparatus according to claim 2, wherein said correcting means includes means for calculating a second angle formed between a) said reference line and b) a straight line connecting said second point represented by said first X-Y coordinate data and a third point represented by second central coordinate data calculated by said calculating means by using the same declination correction value used for calculating the first central coordinate data with respect to second X-Y coordinate data detected by said terrestrial magnetism sensor.

4. An apparatus according to claim 3, wherein said correcting means includes means for increasing the declination correction value by a unit value when said first angle is smaller than said second angle and for decreasing the declination correction value by the unit value when the first angle is greater than the second angle to produce said corrected declination correction value.

5. A vehicle-direction measuring apparatus for determining the direction of a vehicle in correspondence with a declination correction value by obtaining the direction of the vehicle on the basis of X-Y coordinate data detected by a vehicle-mounted terrestrial magnetism sensor, said apparatus comprising:

obtaining means for obtaining the direction of a road on which the vehicle is traveling in correspondence with GPS data;

calculating means for calculating central coordinate data located on a circle of magnetism, said circle having a center representing a true center of magnetism, based on the direction of the road corresponding to the GPS data, a present declination correction value and said X-Y coordinate data detected by said terrestrial magnetism sensor each time the direction of the vehicle corresponding to the GPS data is obtained by said obtaining means;

correcting means for correcting the declination correction value based on outputs of said calculating means to produce a corrected declination correction value; and means for determining the direction of the vehicle in accordance with an output of said terrestrial magnetism sensor and said corrected declination correction value.

* * * * *